June 23, 1970          W. V. GOODELL          3,516,735

LARGE RELATIVE APERTURE PLASTIC LENS SYSTEM

Filed Aug. 26, 1968

| RADII of CURVATURE | AXIAL THICKNESS or SEPARATION | MEAN REFRACTIVE INDEX, $n_D$ | ABBE NUMBER, $\nu$ |
|---|---|---|---|
| $r_1 = -201.68$ | $d_1 = 4.66$ | 1.489 | 54.4 |
| $r_2 = 128.34$ | $d_2 = 4.66$ | | |
| $r_3 = 238.34$ | $d_3 = 18.63$ | 1.590 | 30.3 |
| $r_4 = -124.67$ | $d_4 = 1.16$ | | |
| $r_5 = -293.35$ | $d_5 = 13.97$ | 1.590 | 30.3 |
| $r_6 = -91.67$ | $d_6 = 1.16$ | | |
| $r_7 = 229.17$ | $d_7 = 13.97$ | 1.489 | 54.4 |
| $r_8 = -348.35$ | | | |

INVENTOR
WILLIAM V. GOODELL

BY *Hurvitz, Rose & Greene*

ATTORNEY 3,516,735
LARGE RELATIVE APERTURE PLASTIC LENS SYSTEM
William V. Goodell, Fairfax, Va., assignor to Melpar, Inc., Falls Church, Va., a corporation of Delaware
Filed Aug. 26, 1968, Ser. No. 755,359
Int. Cl. G02b 9/34
U.S. Cl. 350—220                5 Claims

ABSTRACT OF THE DISCLOSURE

A Petzxal-type lens system in which is provided a first lens component in the form of an air-spaced doublet including a divergent lens (I, —) and a convergent lens (II, +), and a second lens component, also an air-spaced doublet, including two convergent lenses (III, +; IV, +). The lenses are composed of plastic of specified indices of refraction to produce lens elements in excess of 19.5 inches diameter, and to provide a lens system of large relative aperture, with correction of aberrations at the periphery, for wide angle viewing of cathode ray tube or other visual displays.

Background of the invention

The present invention relates generally to optical lens systems for viewing large cathode ray tube (CRT) displays, and more particularly to a Petzval lens system utilizing plastic lenses of large aperture.

In the provision of mobile apparatus simulators, such as automobile, locomotive, and aircraft trainers, it becomes necessary to provide the student or trainee, and any instructor or monitor, with relatively large segmented displays, such as a plurality of continguous CRT displays in a mosaic configuration simulating as closely as possible the actual view presented to an operator of the mobile equipment whose operation is being studied. Methods generally in use have been restricted to viewing of small displays with small viewing angles at relatively large relief distances.

Among the principal objects of the present invention are the provision of a large relative aperture plastic lens system for viewing large cathode ray tube displays at relatively small relief distances and with large viewing angles and relatively wide limits of motion of the viewer's or observer's head; and in particular, the provision of a very large clear aperture of over approximately 20 inches, a large relative aperture of $f/1.1$, and the use in the lens system of plastics to achieve a moderately well corrected system.

Summary of the invention

Briefly, according to the present invention, an optical lens system relating to a class known generally as Petzval lenses is composed of four elements in the form of element pairs or doublet components. Referring to the sequence or order of components in which they are traversed by light rays emanating from the object to be viewed, the system includes a compound convergent first component composed of a divergent element and a convergent element optically coupled in the form of an air-spaced doublet; and a compound convergent second component composed of two convergent elements, also optically coupled in the form of an air-spaced doublet. According to my invention. the individual elements are grouped in a predetermined order of values of lens power as follows: (I)—1.143, (II)+1.323, (III)+0.811, (IV)+0.648, in which the sequence is as previously stated and the values of power are given in diopters. Further, the index of refraction of the first and fourth elements of the system is less than 1.49 and the index of refraction of the second and third elements is less than 1.60, in which the refractive index is measured at the wave length of sodium designated as the D-line, the Abbe $v$-value of the first element and fourth element is 54.4, and the Abbe $v$-value of the second and third elements is 30.3.

The lens elements are composed of optical grade plastic, preferably polymethyl methacrylate (acrylic), and polystyrene, each cast, ground, and polished to suitable optical quality.

Brief description of the drawings

The above and still further objects, features, and attendant advantage of the present invention, will become apparent from a consideration of the following detailed description of a preferred embodiment thereof, especially when taken in conjunction with the accompanying drawing, in which.

Description of the preferred embodiment

Figures 1, 2:
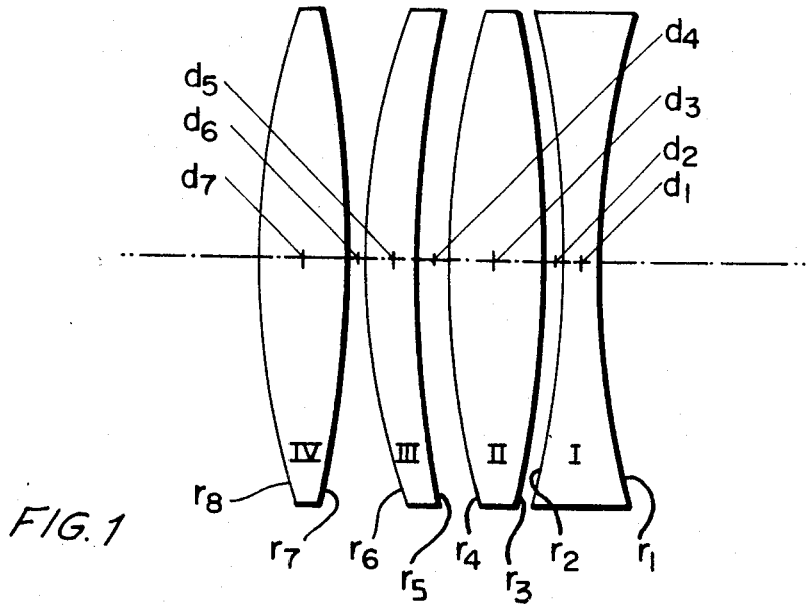
FIG. 1 is a diagrammatic axial section of an objective lens system according to the invention.
FIG. 2 is a table of constructional data for a lens system as shown in FIG. 1 having a focal length of 100 millimeters.

Referring now to the drawing, the lens elements of the optical lens system according to the present invention are designated I, II, III and IV, in ascending order according to the sequence in which they are to be traversed by light rays when the lens system is utilized as a display viewing system. For that application, the optical display, such as a cathode ray tube or mosaic of cathode ray tubes, is disposed to the right of the lens system as pictured in the drawing. The lens system is of the well known Petzval-type, which consists basically of two convergent achromatic components or groups, each of which comprises two lens elements. In the original Petzval lens system, which constituted a portrait objective, the first two elements were cemented together and were separated by an air gap or space from an air-spaced doublet consisting of the second two lens elements. The original lens had excellent definition at the center of the field, but the definition became progressively degraded as one approached the borders of the field. Moreover, the relative aperture was approximately $f/3.6$.

The optical lens system of the present invention, while of the general Petzval type, has a relative aperture approaching $f/1$ and is moderately corrected for aberrations when used as a virtual infinity display. The lens elements themselves are composed entirely of plastic, as will be discussed in greater detail in the ensuing description. In particular, the overall lens system is composed of a compound convergent first component or group consisting of a divergent element I and a convergent element II having the form of an air-spaced doublet, and a compound convergent second component or group consisting of two convergent elements (III and IV) having the form of an air-spaced doublet. The lens power of each element is selected to distribute the positive power of the lens system among the various elements and components in accordance with a determination of the most advantageous ratios of power between lenses of the group. In a preferred embodiment the lens power for each element, specified in diopters, is as follows:

I——1.143
II—+1.323
III—+0.811
IV—+0.648

Preferably the index of refraction of the first and fourth elements (I and IV) is less than 1.49, and the index of refraction of the second and third elements (II and III) is less than 1.60, these refractive indices being measured at the wavelength of sodium referred to as the D-line. Also, the Abbe number (or dispersion index) of the first and fourth elements (I and IV) is 54.4 and the dispersive index of the second and third elements (II and III) is 30.3.

Such an optical system may be constructed with a relative aperture of about $f/1.1$ by using optical grade plastic for each lens element. More specifically, I have found that for the purposes of my invention, polymethyl methacrylate (acrylic) and polystyrene are readily cast, ground and polished by conventional techniques to suitable optical quality as the lens elements. A very large clear aperture of greater than 20 inches can be constructed in this manner. The methacrylate has an index of refraction of 1.489 and the polystyrene an index of refraction of 1.590, measured at a wave length of 5893 A. (angstrom units).

Combinations of lenses composed of these materials permit correction or minimization of certain optical aberrations. In the present exemplary embodiment, the four lenses are arranged in such manner that the light rays emanating from the display screen, situated to the right of the lens system as viewed in the drawing, traverse the lenses in the sequence I, II, III, and IV. Lens element I is an acrylic double concave lens, element II a polystyrene double convex lens, element III a polystyrene meniscus convex lens, and element IV an acrylic double convex lens. Each of these lens elements preferably has a minimum diameter of 19.5 inches.

The remaining characteristics of each lens, that is to say, radius of curvature and axial thickness or separation, are designated in the table shown in FIG. 2 and reproduced below for the sake of convenience.

| Radii of curvature, mm. | Axial thickness or separation, mm. | Mean refractive index, $N_D$ | Abbe number, $\nu$ |
|---|---|---|---|
| $r_1 = -201.68$ | | | |
| | $d_1 = 4.66$ | 1.489 | 54.4 |
| $r_2 = 128.34$ | | | |
| | $d_2 = 4.66$ | | |
| $r_3 = 238.34$ | | | |
| | $d_3 = 18.63$ | 1.590 | 30.3 |
| $r_4 = -124.67$ | | | |
| | $d_4 = 1.16$ | | |
| $r_5 = -293.35$ | | | |
| | $d_5 = 13.97$ | 1.590 | 30.3 |
| $r_6 = -91.67$ | | | |
| | $d_6 = 1.16$ | | |
| $r_7 = 229.17$ | | | |
| | $d_7 = 13.97$ | 1.489 | 54.4 |
| $r_8 = -348.35$ | | | |

The lens system of the invention operates, of course, in a passive manner to modify light rays or beams emanating from the display, such as the CRT display, located at the first principal focus of the lens system, to produce and project parallel rays or beams. The effect is such that the display image is virtual and appears to be located at infinity, this constituting the so-called virtual infinity display.

I claim:
1. The lens system of claim 1 wherein said elements have respective lens powers in diopters in said recited order as follows: $-1.143$, $+1.323$, $+0.811$, $+0.648$.
2. A Petzval-type objective comprising
two air-spaced lens components, each of said components consisting of a respective air-spaced doublet, the first of said components consisting of:
   a double concave lens element and a double convex lens element,
the second of said components consisting of:
   a meniscus convex lens element and a double convex lens element,
each of said lens elements having a diameter of at least 19.5 inches, and having the following further dimensions, in millimeters, and properties:

| Radii of curvature, mm. | Axial thickness or separation, mm. | Mean refractive index, $N_D$ | Abbe number, $\nu$ |
|---|---|---|---|
| $r = -201.68$ | | | |
| | $d = 4.66$ | 1.489 | 54.4 |
| $r_2 = 128.34$ | | | |
| | $d_2 = 4.66$ | | |
| $r_3 = 238.34$ | | | |
| | $d_3 = 18.63$ | 1.590 | 30.3 |
| $r_4 = -124.67$ | | | |
| | $d_4 = 1.16$ | | |
| $r_5 = -293.35$ | | | |
| | $d_5 = 13.97$ | 1.590 | 30.3 |
| $r_6 = -91.67$ | | | |
| | $d_6 = 1.16$ | | |
| $r_7 = 229.17$ | | | |
| | $d_7 = 13.97$ | 1.489 | 54.4 |
| $r_8 = -348.35$ | | | | where $r_1$, $r_2$, and $d_1$ are radii and thickness of the first lens element, $r_3$, $r_4$, and $d_3$ are radii and thickness of the second lens element, $r_5$, $r_6$ and $d_5$ are radii and thickness of the third lens element, $r_7$, $r_8$ and $d_7$ are radii and thickness of the fourth lens element, in the order recited, and $d_2$, $d_4$, and $d_6$ are the spacings of said lens elements in said recited order.

3. The objective of claim 2 wherein each of said lens elements is composed of optical grade plastic.
4. The objective of claim 3 wherein said first and fourth lens elements are acrylic, and said second and third lens elements are polystyrene.
5. The objective of claim 4 wherein said lens elements have respective lens powers in said recited order as follows: $-1.143$, $+1.323$, $+0.811$, $+0.648$, in diopters.

References Cited

UNITED STATES PATENTS 3,363,964   1/1968   Macher _____ 350—214 X

FOREIGN PATENTS 593,514   10/1947   Great Britain.

DAVID SCHONBERG, Primary Examiner

P. A. SACHER, Assistant Examiner

U.S. Cl. X.R.

350—224